(No Model.) 2 Sheets—Sheet 1.

G. A. FEDER.
WIRE WINDING AND DISTRIBUTING MACHINE.

No. 536,782. Patented Apr. 2, 1895.

Witnesses
George Bender
Ad Sali

Inventor
George A. Feder.
By his Attorneys
Keller & Stuick

THE NORRIS PETERS CO., PHOTO-LITHO., WASHINGTON, D. C.

(No Model.) 2 Sheets—Sheet 2.
G. A. FEDER.
WIRE WINDING AND DISTRIBUTING MACHINE.
No. 536,782. Patented Apr. 2, 1895.
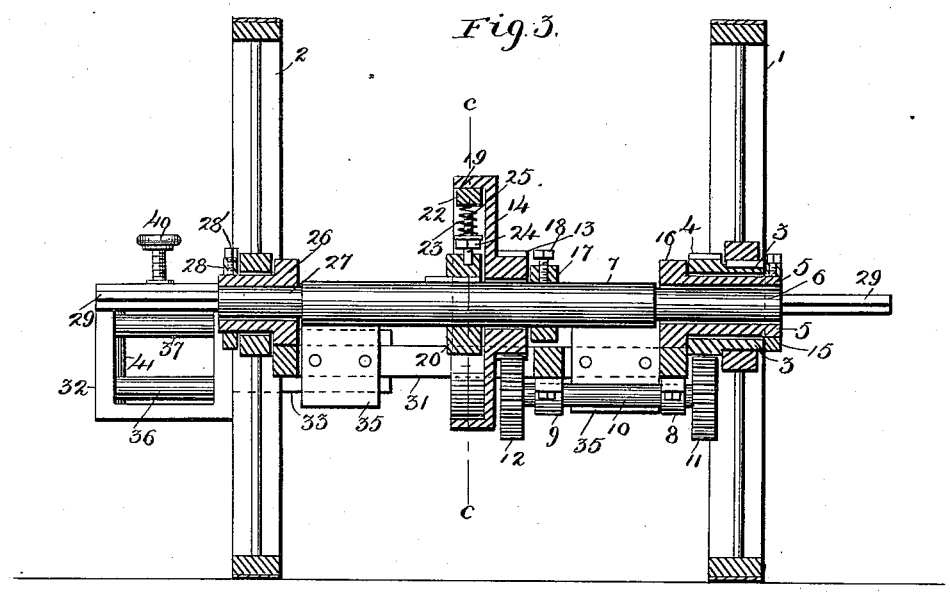
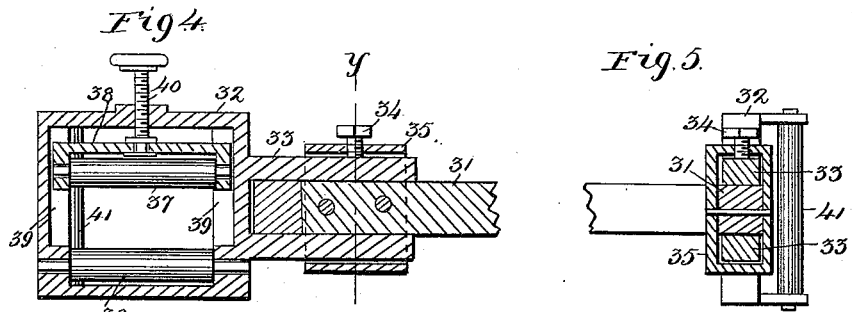
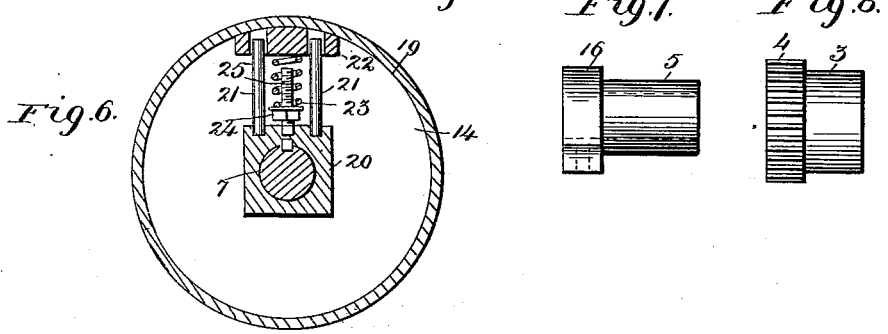
Witnesses
George Bender
Lee Sale
Inventor
George A. Feder
By his Attorneys,
Keller & Stark

UNITED STATES PATENT OFFICE.

GEORGE A. FEDER, OF BELLEVILLE, ILLINOIS.

WIRE WINDING AND DISTRIBUTING MACHINE.

SPECIFICATION forming part of Letters Patent No. 536,782, dated April 2, 1895.

Application filed November 5, 1894. Serial No. 527,936. (No model.)

*To all whom it may concern:*

Be it known that I, GEORGE A. FEDER, of Belleville, Illinois, have invented certain new and useful Improvements in Wire Winding and Distributing Machines, of which the following is a full, clear, and exact description, reference being had to the accompanying drawings, forming a part hereof.

My invention has relation to improvements in wire winding and distributing machines and consists in the novel arrangement and combination of parts more fully set forth in the specification and pointed out in the claims.

Figure 1:
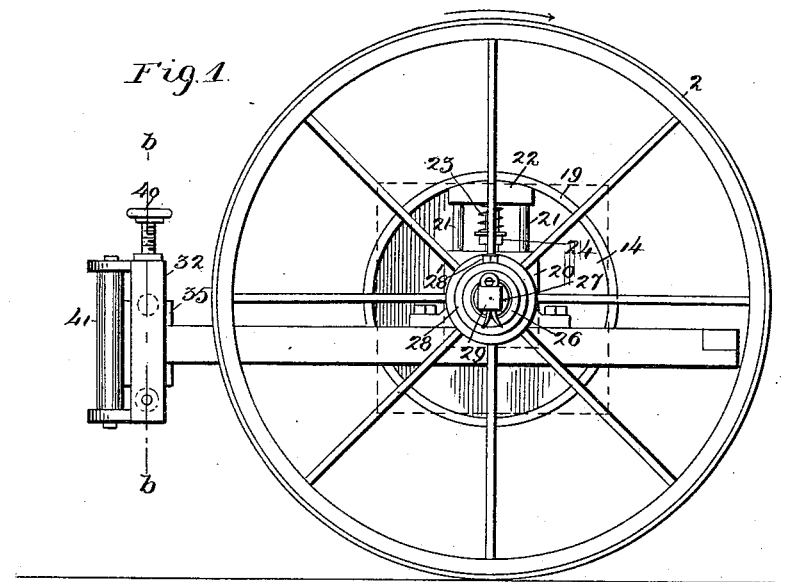
Figure 2:
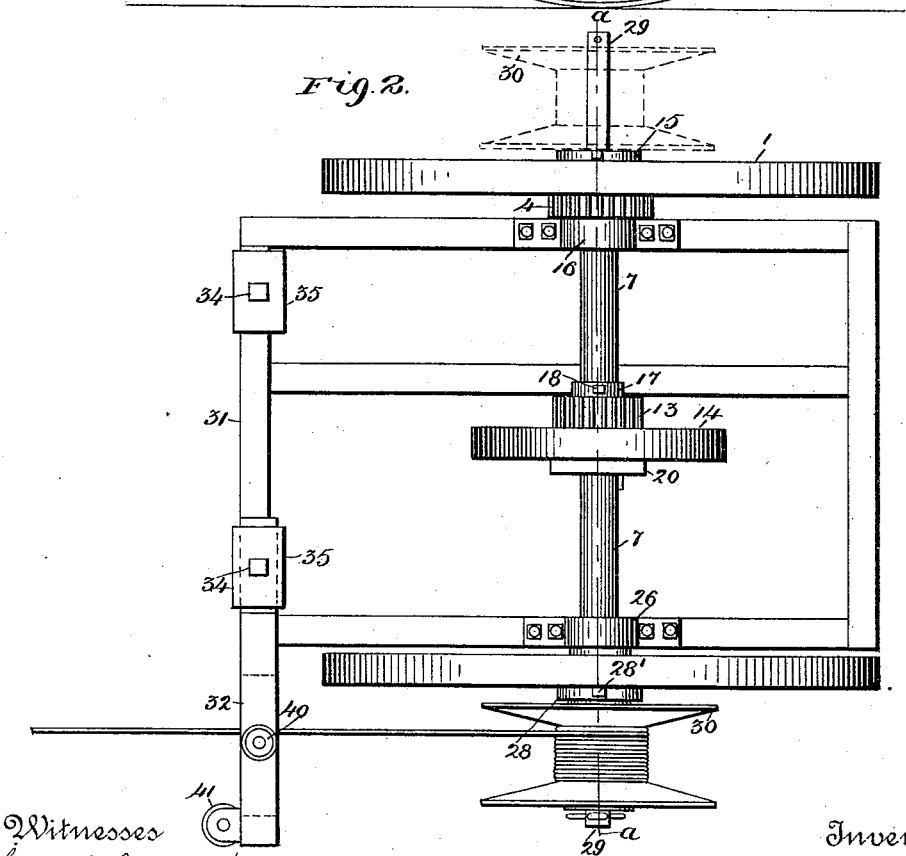

The object of my invention is to construct a wire winding and distributing machine mounted on a wheeled frame, which can wind or unwind the wire with little labor on the part of the operator, and is especially designed for distributing fence wire during the erection of fences, and removing the wire from old fences or those undergoing repairs. To this end I have devised a machine which in detail can be described as follows:

In the drawings, Figure 1 is a side elevation of my complete invention. Fig. 2 is a plan view thereof. Fig. 3 is a vertical section on the line $a-a$ of Fig. 2. Fig. 4 is an enlarged sectional detail of the guide frame taken on the line $b-b$ of Fig. 1. Fig. 5 is a section on the line $y-y$ of Fig. 4. Fig. 6 is a side sectional view on the line $c-c$ of Fig. 3. Fig. 7 is a side detail view of one of the hollow bearings; and Fig. 8 is a side detail view of the gear-bearing sleeve keyed to one of the wheels of the apparatus.

Referring to the drawings, 1 and 2 are the wheels on which the frame of the machine is mounted. Keyed to the wheel 1 about the axis of the latter is a sleeve 3, the inner end of which terminates in a gear wheel 4, the said sleeve being mounted on a hollow bearing 5 which is secured to the frame of the machine and through which loosely passes the reduced end 6 of the main shaft 7 of the machine. Mounted within suitable bearings 8 and 9 of the frame, and below the same is a shaft 10 one end of which carries a gear wheel 11 meshing with the gear wheel 4, and the opposite end carrying a gear wheel 12 which meshes with a gear wheel 13 forming part of or secured to the flanged disk 14 loosely mounted on the shaft 7. The sleeve 3 is prevented from slipping off its hollow bearing by a collar 15 at the outer end of the hollow bearing, and is limited in the opposite direction by the flange 16 of the hollow bearing. The flanged disk 14 is limited too in one direction by the collar 17 secured to the shaft 7 by a bolt 18. Keyed to the shaft 7 and within the flange 19 of the disk 14 is a rectangular block 20 from the outer face of which project the parallel arms 21 along which is adapted to move to and from the ends of said arms, a friction clutch block 22, the said clutch co-operating with the inner surface of the flange 19, its friction against the same being made variable by the coiled spring 23 interposed between the inner surface of the clutch and the adjacent surface of an adjusting nut 24 passed over a screw-threaded stem 25 encircled by the spring, and interposed between the blocks 20 and 22, and confined between the arms 21.

The wheel 2 is mounted on a flanged hollow bearing 26 secured to the frame and passed over the opposite reduced end 27 of the shaft 7, being limited outwardly by the collar 28, the collar itself being secured by the screw 28' to the bearing. (See Fig. 1.) Each of the reduced ends 6 and 27 has a projecting polygonal bearing 29 for the mounting of a spool 30 on which the wire is wound. Mounted on the rear beam 31 of the frame is a detachable guide frame 32, said frame having a fork 33 adapted to embrace the beam, to which said fork can be secured by a clamping bolt 34 passing through the wall of a collar 35 forming a part of or secured to the beam 31, as best seen in Fig. 4. By this arrangement the frame is easily detached. The guide-frame 32 has mounted therein a lower guide roller 36, and an upper guide roller 37, the latter having its bearings in a yoke 38 operating within suitable guides 39, and its relative distance from the roller 36 can be varied by the screw-threaded bolt 40 secured at one end to said yoke and passing outwardly through the frame. A vertical guide and anti-friction roller 41 is mounted at one end of the frame and to one side of the ends of the rollers 36 and 37.

In the operation of the device, as the machine is drawn forward in the direction indicated by the arrow in Fig. 1, the shaft 7, by virtue of the intermediate mechanism between the wheel 1 and the friction clutch controlling the disk 14, will revolve in the same direction as the arrow indicates, and the wire on the spool mounted on the shaft will unwind, passing through the guide frame between the rollers 36, 37, and 41, the free end of the wire being secured to one of the posts of the fence, or held in the hand of one of the operators. Where special tension is required to be brought on the wire as it unwinds from the spool, the rollers 36 and 37 are brought in close proximity so as to hold the wire firmly as it passes between them. Upon the return trip of the machine as it is drawn back and forth in proximity to the fence, the guide frame and spool can both be transferred to the opposite side of the machine, and the same operation can be repeated at each trip. As the spool unwinds, of course the quantity of wire thereon decreases and less wire will be unwound with each revolution of the spool. Under these circumstances the revolutions of the spool or shaft 7 on which it is mounted are increased, this being accomplished by increasing the friction between the inner surface of the flange 19 of the disk 14 and the clutch 22 by tightening the spring 23 confined between the nut 24 and the inner face of the clutch 22. Of course the more friction there is between the clutch and the disk 14 the greater will be the number of revolutions given or imparted to the shaft 7 with each revolution of the drive wheel 1; and the less the friction between the clutch and the disk 14, the more slipping or lost motion will exist between said clutch and disk, and the fewer will be the number of revolutions imparted to the shaft 7. The friction between the clutch and disk is varied according to the circumstances of the case. By this means the rotation imparted to the shaft 7 is made variable at will. Of course the tension of the coiled spring 23 can be so increased and the friction referred to so increased that the shaft 7 will turn in unison with the wheel 1, there being absolutely no lost motion, or it may even turn faster by introducing the proper sized gearing to accomplish this.

Having described my invention, what I claim is—

1. In a wire winding and distributing machine, a suitable frame, a shaft mounted in said frame, wheels loosely mounted about said shaft and rotating independently thereof, a disk loosely mounted on said shaft, a friction clutch secured to the shaft and co-operating with the disk, suitable running gear between the disk and one of the wheels for imparting motion to the disk, suitable tension springs for said clutch mechanism, means for increasing or diminishing the tension of said springs, and thus imparting variable motion to the shaft, and a spool adapted to be secured to and revolve with the shaft carrying the disk, substantially as set forth.

2. In a wire winding and distributing machine, a suitable shaft, hollow bearings passed over the opposite ends thereof, a sleeve passed over one of said hollow bearings, a driving wheel keyed to said sleeve, a gear wheel carried by said sleeve, a flanged disk loosely mounted on the shaft intermediate of its ends, a clutch keyed to the shaft co-operating with the flange of said disk, a second shaft mounted from the frame, a gear wheel at one end of the shaft meshing with the gear carried by the sleeve, a gear wheel at the opposite end of the shaft, a gear wheel forming a part of the disk meshing with said second gear wheel on the last named shaft, and a second wheel mounted over the hollow bearing at the opposite end of the main shaft, substantially as set forth.

3. In a wire winding and distributing machine, a revolving shaft, a disk loosely mounted thereon, a peripheral flange on said disk, a block keyed to the shaft within the flange, parallel arms projecting from said block, a clutch block reciprocating along said arms, a stem on the block between the arms, an adjusting nut on said stem, a coiled spring interposed between the nut and clutch and encircling the stem, the clutch conforming to the curvature of the inner surface of the flange, and means for imparting rotation to the disk, substantially as set forth.

4. In a wire winding and distributing machine, a detachable guide frame comprising a suitable fork for embracing the beam of the machine-frame, a lower horizontal roller mounted in said frame, an upper roller, a yoke for said second roller, guides for said yoke, an adjusting bolt for said yoke, and a vertical roller adjacent to one end of the horizontal rollers, substantially as set forth.

In testimony whereof I affix my signature in the presence of two witnesses.

GEORGE A. FEDER.

Witnesses:
GEORGE BENDER,
LEE SALE.